United States Patent [19]

McCartney

[11] Patent Number: 4,530,620
[45] Date of Patent: Jul. 23, 1985

[54] LANDFILL COMPACTOR VEHICLES

[75] Inventor: Bernard McCartney, Stockport, England

[73] Assignee: Bernard McCartney Limited, Stockport, England

[21] Appl. No.: 467,580

[22] Filed: Feb. 17, 1983

[51] Int. Cl.³ .............................................. B60B 15/00
[52] U.S. Cl. ...................................... 404/121; 301/43
[58] Field of Search ................. 301/43, 44 R, 44 T, 301/44 B, 45, 46, 50; 305/53, 54, 39; 172/177, 554, 744, 785; 404/121, 124, 125, 126

[56] References Cited

U.S. PATENT DOCUMENTS

| 3,450,013 | 6/1969 | Peterson | 404/121 X |
| 3,463,063 | 8/1969 | Caron et al. | 301/43 X |
| 3,853,419 | 12/1974 | Bertram et al. | 404/121 |
| 4,074,942 | 2/1978 | Cochran | 404/121 |

Primary Examiner—David A. Scherbel
Attorney, Agent, or Firm—Sughrue, Mion, Zinn, Macpeak, and Seas

[57] ABSTRACT

A landfill compactor vehicle comprises two forward wheels and two rear wheels, each wheel having on its rim teeth having a substantially arrowhead configuration, when viewed in plan, each tooth having at least a slicing portion and a tamping portion, the teeth are arranged in a twin helical turbine pattern around the wheel rim. The disposition of the teeth pattern and the attitude of the teeth for each wheel is different to that of the other three wheels and this taken with the aforesaid arrowhead configuration of the teeth ensures a mincing action on refuse, waste and soil over which such a landfill compactor vehicle is driven.

6 Claims, 15 Drawing Figures

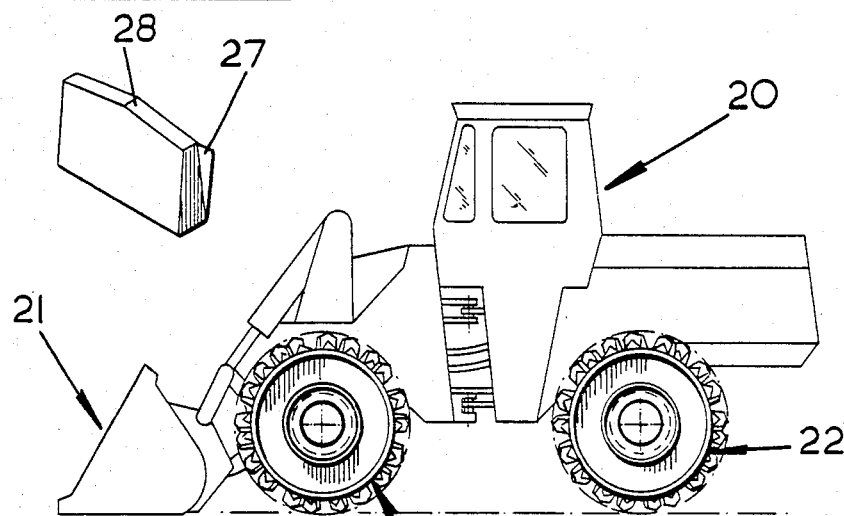
FIG. 1a
FIG. 1
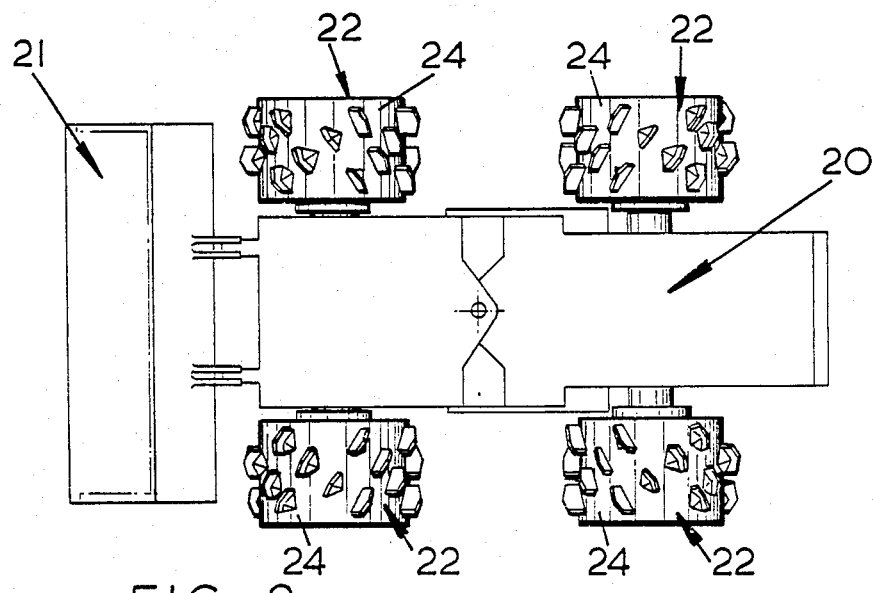
FIG. 2

LANDFILL COMPACTOR VEHICLES

This invention relates to landfill compactor vehicles and more especially to wheels for use in such vehicles.

A landfill compactor vehicle is a vehicle, usually an earth-moving vehicle, which is used to spread household and other refuse or waste over an area of land to be filled and while doing so to break up or disintegrate the refuse and waste, intermix it with the soil, and compact same together. This is achieved by providing the vehicle with heavy metal, usually steel, wheels which have metal, again usually steel, teeth projecting from the rims thereof. The movement of such a vehicle across the refuse mass allows the toothed wheels to effect the required disintegrating and compacting operations.

It is an object of the present invention to provide a wheel for use on a landfill compactor vehicle which gives a greater degree of disintegration and compaction than has been possible hitherto.

According to the present invention there is provided a wheel for a landfill compactor vehicle which has on its rim teeth having a substantially arrowhead configuration, when viewed in plan, the teeth being arranged in a twin helical turbine pattern around the wheel rim.

The teeth may be of single arrowhead or double arrowhead configuration.

Preferably each tooth has a slicing portion and a tamping, i.e. a crushing and compressing, portion. The slicing portion may be disposed between two tamping portions.

The tamping portion of each tooth may lie normal to the longitudinal centreline of the or each slicing portion, or it may be inclined or skewed relative to the centreline. In the latter case, scrapers may be employed although these are by no means essential since the teeth according to the present invention are self cleaning due to the angled configuration of the tamping portion or portions.

The teeth are preferably angled on the wheel rim across the direction of the vehicle movement and are disposed in overlapping arrangement so that the full area of land covered by the wheel during a single rotation has been subjected to the slicing and tamping actions. A preferred angle is 55°.

With a landfill compactor vehicle having four ground-engaging wheels in accordance with the present invention, the teeth on the wheels are set and the teeth patterns are selected so that the front wheels tend to "screw" the refuse or waste inboard of the vehicle while the rear wheels tend to "screw" the refuse or waste outboard of the vehicle or vice versa depending on the direction of travel of the vehicle, the teeth of the front wheels (where the teeth are of single arrowhead configuration) having the slicing portion leading while, in the case of the rear wheels, the slicing portion trails in the direction of wheel rotation.

Where the teeth are of double arrowhead configuration the slicing portion is both led and trailed by a tamping portion.

An embodiment of the present invention will now be described, by way of example, with reference to the accompanying drawings, in which:

FIGS. 1 and 2 are respectively a side elevation and plan view of a landfill compactor vehicle incorporating wheels according to the present invention;

FIG. 1a is a perspective view of a tooth on one of the wheels of the vehicle of FIG. 1.

Figure 3:
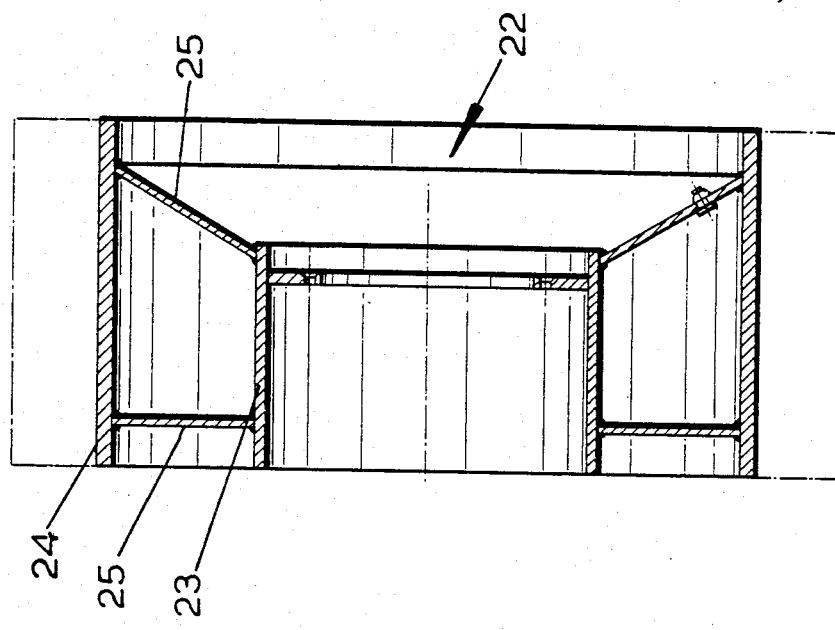
FIGS. 3 and 4 are respectively a sectional view and side elevation of a wheel for use in the present invention.

The landfill compactor vehicle may be of any convenient form and in the present instance is illustrated as a tractor 20 having a front bucket loader 21.

The tractor has four wheels 22 of welded construction each having a central hub 23 secured to and within a rim 24 by plates 25. Each wheel 22 is preferably made from heavy gauge high yield steel and is fabricated employing inert gas continuous welding techniques.

Teeth 26 are welded to and around the rim 24 to effect the slicing and tamping operations on the waste or refuse.

These teeth 26 and the pattern in which they are arranged around the wheel rim 24 constitute the essence of the present invention.

These teeth 26 are cast, for example, in austentic manganese steel and are welded to the wheel rim 24 using, for example, inert gas continuous welding techniques.

It will be manifest that the bottom of each tooth 26 is curved to match the curvature of the wheel rim 24.

Figure 10:
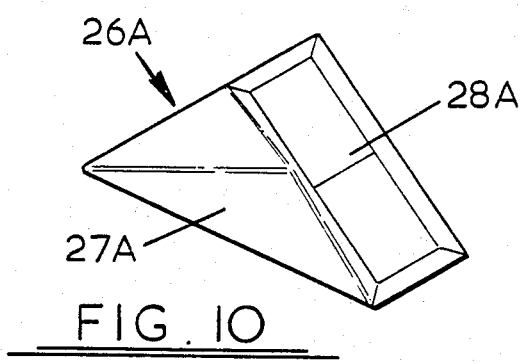
FIGS. 6, 8, 10 and 12 are plan views of different forms of teeth employed in wheels according to the invention.
Figure 8:
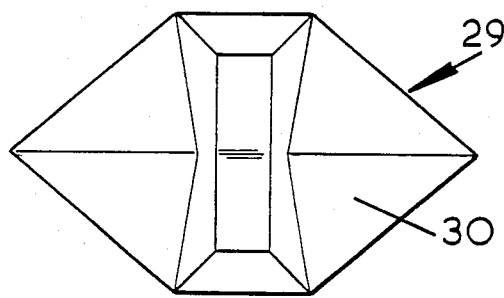
Figure 12:
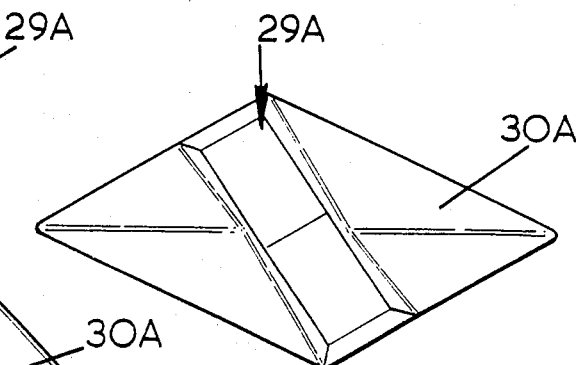
Figure 14:
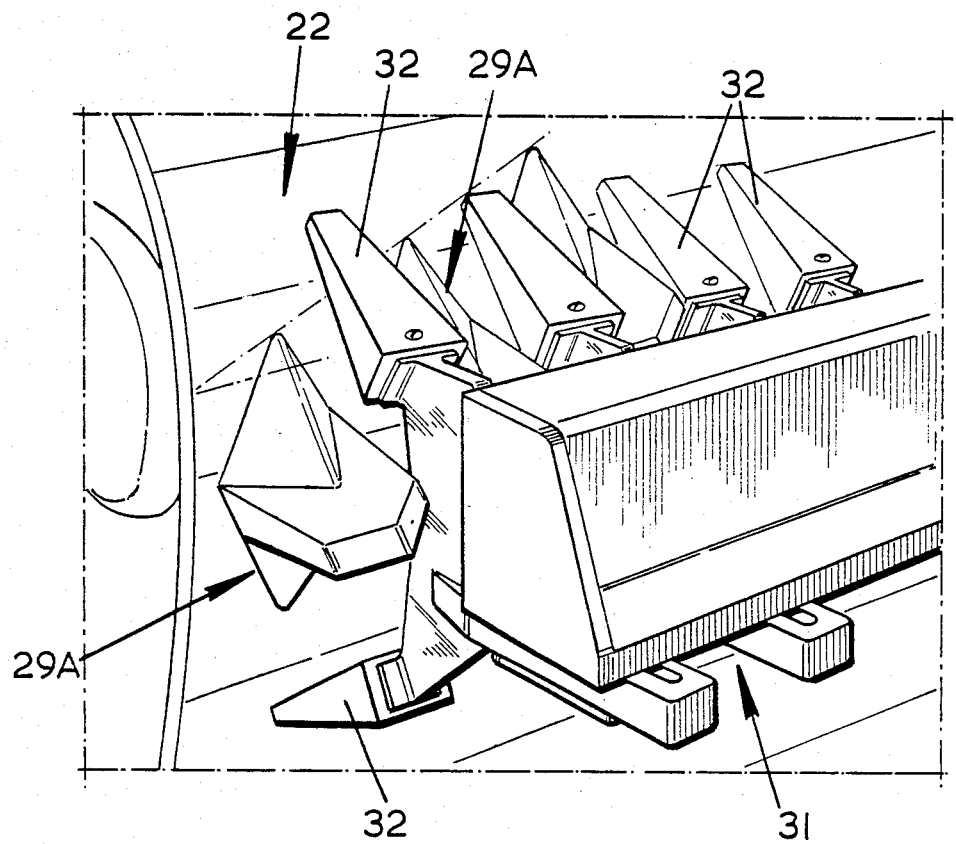
FIG. 14 is a perspective view of a wheel having double arrowhead teeth with associated scrapers.

Each tooth 26, in plan view, has a single arrowhead configuration (see FIGS. 6 and 10), or a double arrowhead configuration (see FIGS. 8 and 12).

Figure 4:
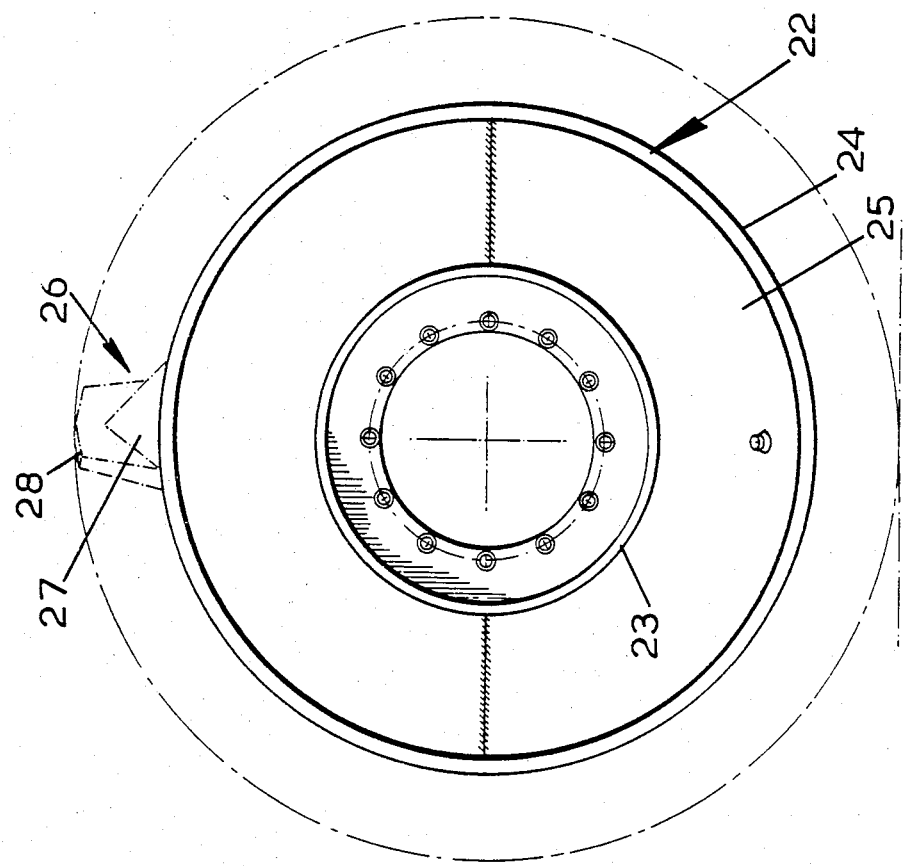
Figure 7:
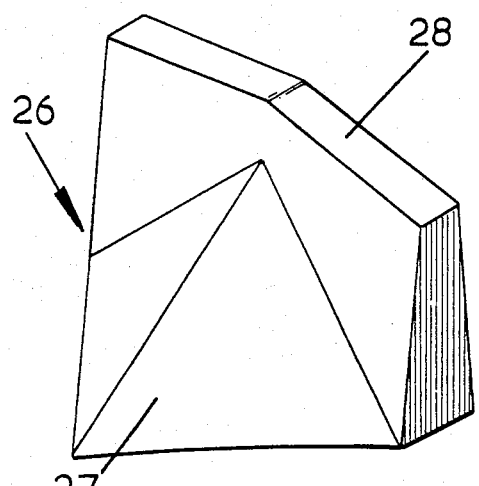
Figure 6:
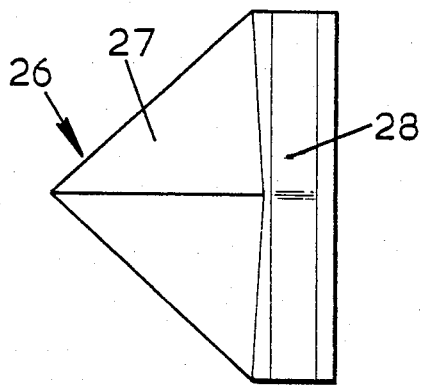

The tooth 26 of FIGS. 6 and 7 has a tamping portion 27 and a slicing portion 28. The slicing portion 28 extends radially beyond the tamping portion 27 when the tooth 26 is fitted on the wheel 22 as can clearly be seen in FIGS. 1 and 4.

The angled configuration of the faces (angle approximately 43° of the tamping portion 27 renders each tooth 26 substantially self-cleaning since waste or refuse and soil picked up by the tooth tends to slide down these faces and to be forced along the wheel rim to the next tooth as the tooth moves upwardly due to the rotation of the wheel. This movement along the wheel rim causes a compressing action whereby the waste, refuse and soil lifts away from the wheel rim and falls off. This results from the weight of the machine moving over the waste, refuse and soil and the fact that the rotating teeth lie at an angle of 55° to the direction of motion of the wheel.

In effect, the waste, refuse and soil slides up the angled face of the tooth, is compressed against the next tooth and falls off the wheel.

In effect, what occurs is that slicing portion 28 guillotines the refuse, waste and soil while the tamping portion 27 crushes and compresses the refuse or waste, i.e. a mincing action occurs. This is repeated for every tooth on each wheel 22.

Due to the layout of teeth in a twin helical turbine pattern around each wheel as shown and also due to the fact that each leading wheel pattern is opposed to each rear trailing wheel pattern (see FIG. 2) the refuse or waste is subjected to multiple slicing, tamping operations in a "cross-chop" action which substantially reduces the particle size of the refuse or waste.

As can be seen from FIG. 2 each tooth 26 of each front wheel acts inwardly in the direction of vehicle movement with its slicing portion leading its tamping portion, while each tooth 26 of each rear wheel acts outwardly with its tamping portion leading its slicing portion, thereby providing the aforesaid "cross-chop" action.

Figure 5:
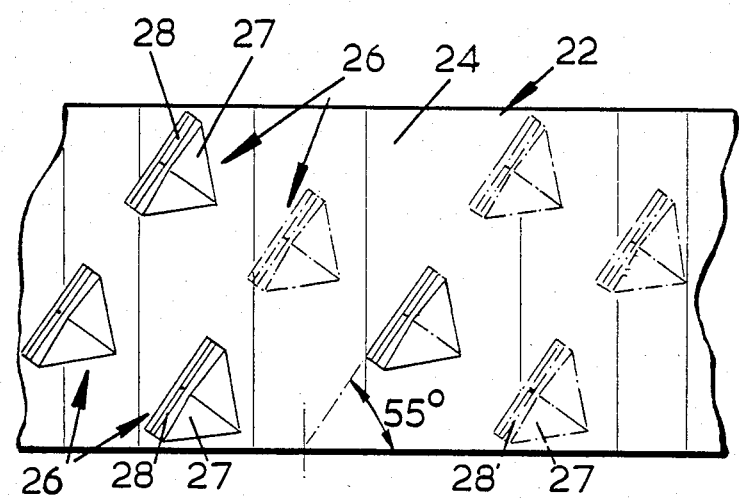
FIG. 5 is a diagrammatic fragmentary plan view of a wheel according to the invention and illustrating the teeth pattern.

Moreover, considering each wheel and its teeth pattern it is to be noted that only one tooth at a time is being progressively engaged in the refuse or waste due to the angle (55°-see FIG. 5) at which the teeth are set across the wheel. This, coupled with the large tooth areas substantially increases tractive effort when compared with conventional landfill compactor wheels and ensures a smooth passage of the vehicle through the refuse or waste.

The second important action of the compactor wheels according to the invention due to the configuration of the teeth and their pattern on the wheels (see FIG. 2) is that waste or refuse under the two front wheels is urged or "screwed" towards the centreline of the vehicle while, in the case of the two rear wheels, it is urged or "screwed" outwardly of the vehicle. Reversal of the direction of movement of the vehicle reverses these "screwing" actions.

This "screwing" action coupled with the aforesaid "cross-chop" action results in the waste or refuse being, in effect, minced into very small particles.

Figure 11:
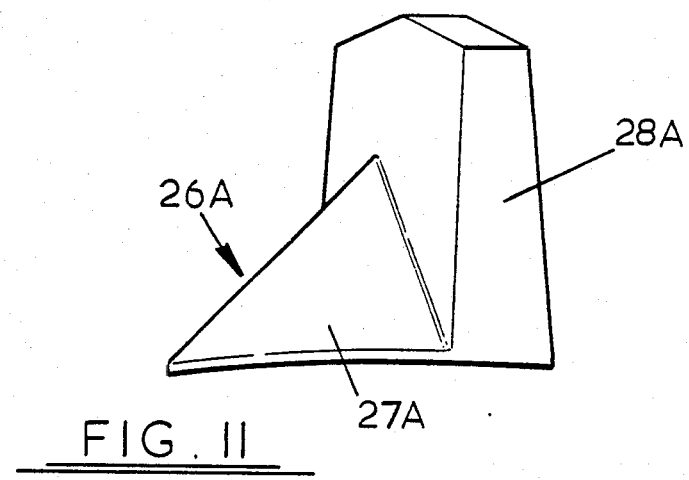
FIGS. 7, 9, 11 and 13 are corresponding perspective views of these teeth.
Figure 9:
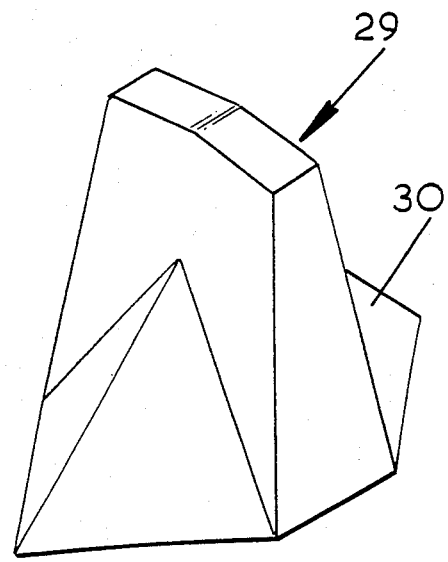

The tooth 26A of FIGS. 9 and 11 differs from that of FIGS. 6 and 7 in that slicing portion 28A is angled or skewed relative to the tamping portion 27A, the arrowhead configuration being asymmetric.

The tooth 29 of FIGS. 8 and 9 is, in effect, a double tooth 26 in that it is identical with tooth 26 but has a second and trailing tamping portion 30 so that with this tooth there is a tamping, slicing, tamping action. It has a greater disintegrating action than tooth 26.

Figure 13:
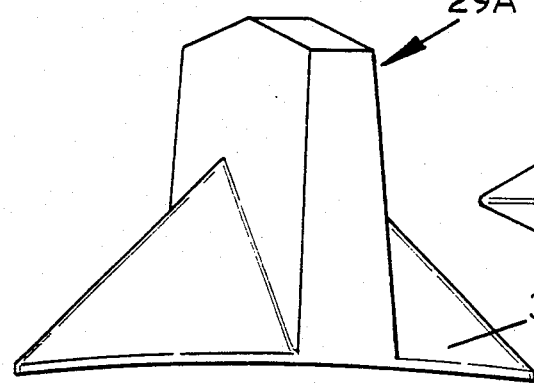

The tooth 29A of FIGS. 12 and 13 is, similarly, a double tooth 26A by virtue of the second and trailing tamping portion 30A.

With the latter teeth 29A, and possibly 26A, operators sometimes employ a conventional wheel scraper assembly 31 supported in centilever fashion from the vehicle side and provided with scraper members 32 which lie between adjacent teeth of a row.

What is claimed is:

1. A landfill compactor vehicle comprising two front ground-engaging steel wheels, two rear ground-engaging steel wheels, each of said wheels having a cylindrical rim, compactor teeth of cast construction welded to and extending radially outwardly of the rim of each ground-engaging steel wheel, and each cast compactor tooth comprising at least one slicing portion integral with a tamping portion, said slicing portion extending radially outwards of the tamping portion, said slicing portion being generally of rectangular plate-like configuration with a wheel rim-remote peak, said tamping portion being of substantially pyramidal configuration extending from a face of said slicing portion, said compactor teeth of each wheel being arranged around the rim thereof in a twin helical pattern with slicing portions thereof lying at an acute angle to the direction of rotation of the wheel, the wheels being fitted onto the landfill compactor vehicle with the slicing portions of the compactor teeth of the two front wheels leading the tamping portions thereof, in terms of the direction of wheel rotation, the tamping portions of the two rear wheels lead the slicing portions thereof, in terms of the direction of wheel rotation, and the slicing portions of the teeth of one front wheel and its opposite rear wheel lying in the same or parallel planes while the slicing portions of the teeth of the other front wheel and its opposite rear wheel lie in the same or parallel planes normal to the first-mentioned planes; whereby, the front wheel teeth have an inboard "screwing" action on the refuse or waste, while the rear wheel teeth have an outboard "screwing" action, or vice versa, depending upon the direction of vehicle travel.

2. A landfill compactor vehicle as claimed in claim 1, in which the center line of the tamping portion of each tooth extends normally from its slicing portion.

3. A landfill compactor vehicle as claimed in claim 1, wherein each compactor tooth comprises, in terms of the direction of wheel rotation, on opposed faces of its slicing portion a leading integral tamping portion and a trailing integral tamping portion.

4. A landfill compactor vehicle as claimed in claim 3, wherein the center lines of both leading and trailing tamping portions are disposed normally to the intermediate slicing portion.

5. A landfill compactor vehicle as claimed in claim 3, wherein the center lines of both the leading and trailing integral tamping portions of each tooth are inclined reliaove to the intermediate slicing portion.

6. A landfill compactor vehicle as claimed in claim 5, wherein the compactor teeth of each wheel are disposed in circumferential rows, and said vehicle is further provided with a wheel scraper assembly for each wheel having scraper members extending into the interrow spaces.

7. A landfill compactor vehicle as claimed in claim 1, wherein the center line of the tamping portion of each tooth is inclined relative to its slicing portion.

* * * * *